(12) United States Patent
Kraus et al.

(10) Patent No.: US 9,006,313 B2
(45) Date of Patent: Apr. 14, 2015

(54) POLYCONDENSATES HAVING ISOBUTYLENE SIDE CHAIN

(75) Inventors: Alexander Kraus, Pittenhart (DE); Frank Dierschke, Oppenheim (DE); Fabian Becker, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 257 days.

(21) Appl. No.: 13/390,858

(22) PCT Filed: Aug. 3, 2010

(86) PCT No.: PCT/EP2010/061286
§ 371 (c)(1), (2), (4) Date: Apr. 27, 2012

(87) PCT Pub. No.: WO2011/026701
PCT Pub. Date: Mar. 10, 2011

(65) Prior Publication Data
US 2012/0208932 A1 Aug. 16, 2012

(30) Foreign Application Priority Data

Sep. 1, 2009 (EP) .................................. 09169130

(51) Int. Cl.
*C08L 85/02* (2006.01)
*C04B 24/32* (2006.01)
*C08G 79/04* (2006.01)

(52) U.S. Cl.
CPC ................ *C08G 79/04* (2013.01); *C04B 24/32* (2013.01)

(58) Field of Classification Search
CPC ................................ C08G 79/04; C04B 24/32
USPC ..................................... 528/129, 148; 524/3, 5
See application file for complete search history.

(56) References Cited

U.S. PATENT DOCUMENTS

| 3,954,808 | A | 5/1976 | Elliott et al. |
| 5,779,742 | A | 7/1998 | Baker |
| 5,856,279 | A | 1/1999 | Baker |
| 6,147,036 | A | 11/2000 | Baker |
| 7,910,640 | B2 | 3/2011 | Wieland et al. |
| 2008/0108732 | A1 | 5/2008 | Wieland et al. |

FOREIGN PATENT DOCUMENTS

| DE | 2 354 995 | 5/1974 |
| JP | H 0517784 A | 1/1993 |
| WO | WO 2006/042709 A1 | 4/2006 |

OTHER PUBLICATIONS

Machine translation of JP 05-017784. Jan. 1993.*
(Continued)

*Primary Examiner* — John Uselding
(74) *Attorney, Agent, or Firm* — Curatolo Sidoti Co., LPA; Joseph G. Curatolo; Salvatore A. Sidoti (57) ABSTRACT

A polycondensation product based on aromatics and/or heteroaromatics and aldehydes, the polycondensate containing at least one structural unit (I) having a polyisobutylene side chain and an aromatic or heteroaromatic and at least one structural unit (II) having an ionizable functional group and an aromatic or heteroaromatic, structural unit (I) not being the same as structural unit (II) and the aldehyde used having no acid or ester functions. A process for the preparation and the use as an additive for hydraulic binders are disclosed.

23 Claims, 1 Drawing Sheet

(56) References Cited

OTHER PUBLICATIONS

PCT/EP2010/061286—International Search Report, Dec. 20, 2010.
Biglova, R., et al, "Synthesis of New Stabilisers through Polymer-analogous Conversions", Oxidation Communications, Jan. 1, 1997, vol. 20, No. 1, pp. 139-144, XP009140808.

PCT/EP2010/061286—International Preliminary Report on Patentability, Mar. 6, 2012.
JP 2012-527263—Translation of Office Action in corresponding Japanese application, Mar. 17, 2014.

* cited by examiner

POLYCONDENSATES HAVING ISOBUTYLENE SIDE CHAIN

CROSS REFERENCE TO RELATED APPLICATIONS

This application is a national stage application of International Application No. PCT/EP2010/061286, filed 3 Aug. 2010, which claims priority from European Patent Application Serial No. 09169130.3, filed 1 Sep. 2009, from which applications priority is claimed, and which are incorporated herein by reference.

The present invention relates to a polycondensation product comprising at least one structural unit having a polyisobutylene side chain and an aromatic or heteroaromatic and at least one further aromatic or heteroaromatic structural unit which has an ionic functional group, a process for the preparation thereof and the use thereof.

Polycondensates based on aromatics or heteroaromatics and aldehydes have long been of considerable importance as plastics and coatings. For example, the polycondensation products of phenol and formaldehyde are heat-stable materials which are referred to as Bakelites after their discoverer Baekeland (1909). Bakelites were the first industrially produced plastics.

Furthermore, for example, specific phenol-formaldehyde condensates which are known by the trade name Wolfatites or Levatites can be used as ion exchangers.

DE 2354995 describes the use of polycondensates as lubricant additives. Regarding the preparation, the condensation of alkylphenols with aldehydes is disclosed, the aldehydes used having acid or ester groups. Polyisobutylene-substituted phenols are also used as alkylphenols.

WO 2006/042709 discloses the use of polycondensation products based on an aromatic or heteroaromatic compound having 5 to 10 C atoms or heteroaromatics having at least one oxyethylene or oxypropylene radical and aldehydes selected from the group consisting of formaldehyde, glyoxylic acid and benzaldehyde as dispersants for inorganic binder suspensions.

Such polycondensation products permit a reduction of the proportion of water in cementitious binder systems. As a result, a higher compressive strength and a denser structure of the hardened binder matrix can be achieved. A structure which is as dense as possible is of considerable importance for the durability of concrete structures since the transport of substances through the binder matrix is made more difficult thereby and the reinforcement steel is protected from corrosion. With regard to the prior art, a further improvement in the durability of concrete structures is of considerable interest.

It was therefore an object of the present invention to develop an admixture for cementitious binder systems which further increases the durability of concrete structures and in particular protects the reinforcement steel from corrosion.

This object is achieved by a polycondensation product based on aromatics and/or heteroaromatics and aldehydes, said polycondensation product containing at least one structural unit (I) having a polyisobutylene side chain and an aromatic or heteroaromatic and at least one structural unit (II) having an ionizable functional group and an aromatic or heteroaromatic, structural unit (I) differing from structural unit (II) and the aldehyde used having no acid or ester functions.

It was found that the plasticizers according to the invention firstly reduce the water requirement of cementitious binder systems and therefore produce a denser structure of the hardened binder matrix in a known manner. Furthermore, however, transport processes of dissolved, in particular ionic substances in the binder matrix are surprisingly reduced to a considerable extent by the polycondensate according to the invention, with the result that reinforcement steel is effectively protected from corrosion.

It was particularly surprising here that the processability of the fresh concrete is not adversely affected by the hydrophobic properties of the polyisobutylene side chains of the polycondensation product.

In a preferred embodiment, the polyisobutylene side chain of the structural unit (I) has at least three isobutylene units, in particular between 3 and 200 isobutylene units, particularly preferably between 4 and 100 isobutylene units and particularly preferably between 4 and 50 isobutylene units.

In a preferred embodiment, the polycondensation product according to the invention contains the structural unit (I) in an amount of between 0.01 and 99.9% by weight, preferably between 1.0 and 99.0% by weight, in particular between 2.0 and 95.0% by weight and particularly preferably between 5.0 and 90.0% by weight, and the structural unit (II) in an amount of between 0.01 and 99.9% by weight, preferably between 1.0 and 99.0% by weight, in particular between 2.0 and 95.0% by weight and particularly preferably between 5.0 and 90.0% by weight.

The structural unit (I) is represented in particular by the following general formula where G are identical or different and are represented by a substituted or unsubstituted aromatic or heteroaromatic compound having 4 to 12 C atoms, preferably 5 to 10 C atoms, preferably phenol, benzene, methylbenzene, cresol, resorcinol, nonylphenol, methoxyphenol, naphthol, methylnaphthol, butylnaphthol, bisphenol A, aniline, methylaniline, hydroxyaniline, methoxyaniline, furfuryl alcohol and salicylic acid, where q=0 to 4 where

F, independently of one another, are identical or different and are represented by $OH$, $OR^1$, $NH_2$, $NHR^1$, $NR^1_2$, $C_1$-$C_{10}$-alkyl, $SO_3H$, $COOH$, $PO_3H_2$, $OPO_3H_2$, it being possible for the $C_1$-$C_{10}$-alkyl radicals in turn to have phenyl or 4-hydroxyphenyl radicals and $R^1$ denoting a $C_1$-$C_4$-radical, where J are identical or different and are represented by a polyisobutylene side chain, in particular having at least three isobutylene units, preferably between 3 and 200 isobutylene units, particularly preferably between 4 and 100 isobutylene units and particularly preferably between 4 and 50 isobutylene units.

Among the substituted or unsubstituted, aromatic or heteroaromatic compounds having 4 to 12 C atoms, preferably 5 to 10 C atoms, of the structure G in formula (I), the number of carbon atoms is to be understood to refer to those which are located in the aromatic or heteroaromatic ring system(s).

Any substituents present, in the case of substituted aromatic or heteroaromatic compounds, on the structural unit G are not to be employed in calculating the number of C atoms.

For example, in accordance with the above definition, the number of C atoms would be 6 for nonylphenol and methoxyphenol, 12 for bisphenol A and 4 for furfuryl alcohol.

The structural unit (I) is particularly preferably 4-polyisobutylenephenol.

The ionizable functional group of the structural unit (II) of the polycondensation product is preferably at least one ionizable functional group from the series consisting of $SO_3H$, COOH, $PO_3H_2$, dialkylamine, trialkylammonium and $OPO_3H_2$, particularly preferably $SO_3H$, $OPO_3H_2$ and/or a phosphoric acid diester.

In a preferred embodiment, the structural unit (II) is represented by the following general formulae L-Q-O-M         (II)

Q are identical or different and are represented by a substituted or unsubstituted aromatic or heteroaromatic compound having 4 to 12 C atoms, preferably 5 to 10 C atoms,
L are identical or different and are represented by an ionizable functional group from the series consisting of $SO_3H$, COOH, $PO_3H_2$, $OPO_3H_2$, dialkylamine or trialkylammonium,
O is oxygen,
M are identical or different and are represented by H, a $C_1$- to $C_{10}$-alkyl radical, $C_1$- to $C_{10}$-hydroxyalkyl radical, $C_1$- to $C_{10}$-carboxylic acid, aryl radical or heteroaryl radical.

Among the substituted or unsubstituted, aromatic or heteroaromatic compounds having 4 to 12 C atoms, preferably 5 to 10 C atoms, of the structure Q in the structural unit (II), the number of carbon atoms is to be understood to refer to those which are located in the aromatic or heteroaromatic ring system(s).

Any substituents present, in the case of substituted aromatic or heteroaromatic compounds, on the structural unit Q are not to be employed in calculating the number of C atoms.

In a further preferred embodiment, the structural unit (II) is preferably represented by the following general formulae where
D are identical or different and are represented by a substituted or unsubstituted aromatic or heteroaromatic compound having 4 to 12 C atoms, preferably 5 to 10 C atoms,
where
E are identical or different and are represented by N, NH or O,
where
m=2 if E=N and m=1 if E=NH or O,
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H,
where b
are identical or different and are represented by an integer from 0 to 300.

Among the substituted or unsubstituted, aromatic or heteroaromatic compounds having 4 to 12 C atoms, preferably 5 to 10 C atoms, of the structure D in the general formula (II), the number of carbon atoms is to be understood to refer to those which are located in the aromatic or heteroaromatic ring system(s).

Any substituents present, in the case of substituted aromatic or heteroaromatic compounds, on the structure D are not to be employed in calculating the number of C atoms.

In particular, the structural unit (II) may be phenoxyethanol phosphate, N-phenyldiethanolamine diphosphate, anisolesulphonic acid, phenoxyethanolsulphonic acid, phenolsulphonic acid, phenoxyacetic acid or phenoxypropionic acid.

In order to adapt the properties of the products according to the invention to the respective intended use, it may be advantageous to incorporate further structural units in the form of polymerized units. These may be in particular at least one structural unit (III) having a polyether side chain and an aromatic or heteroaromatic.

The structural unit (III) is preferably represented by the following general formulae where
A are identical or different and are represented by a substituted or unsubstituted aromatic or heteroaromatic compound having 4 to 12 C atoms, preferably 5 to 10 C atoms,
where
B are identical or different and are represented by N, NH or O,
where
n=2 if B=N and n=1 if B=NH or O,
where
$R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H,
where
a are identical or different and are represented by an integer from 1 to 300,
where X
are identical or different and are represented by a branched or straight-chain $C_1$- to $C_{10}$-alkyl radical, $C_5$- to $C_8$-cycloalkyl radical, a branched or straight-chain $C_1$- to $C_{10}$-carboxylic acid ester radical, aryl radical, heteroaryl radical or H.

Among the substituted or unsubstituted, aromatic or heteroaromatic compounds having 4 to 12 C atoms, preferably 5 to 10 C atoms, of the structure A in the general formula (III), the number of carbon atoms is to be understood to refer to those which are located in the aromatic or heteroaromatic ring system(s).

Any substituents present, in the case of substituted aromatic or heteroaromatic compounds, on the structure A are not to be employed in calculating the number of C atoms.

The aromatic or heteroaromatic of the structural units (II) and (III) is preferably phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl or 4-methoxynaphthyl, preferably phenyl, it being possible to select these optionally independently of one another and it also being possible for them to consist in each case of a mixture of said compounds.

The radicals $R^3$, $R^4$ and optionally $R^1$ and $R^2$ in the structural units (II) and (III) can be selected independently of one another and are preferably represented by H, methyl, ethyl or phenyl, particularly preferably by H or methyl and especially preferably by H.

Preferably, a in structural unit (III) is represented by an integer from 5 to 280, in particular 10 to 160 and particularly preferably 12 to 120 and b in structural unit (II) by an integer from 0 to 10, preferably 1 to 7 and particularly preferably 1 to 5. The respective radicals whose length is defined by a or b may consist here of uniform structural groups, but it may also be expedient for them to be a mixture of different structural groups. Furthermore, the radicals of the structural units (II) and optionally (III) may have, independently of one another, in each case the same chain length, a or b each being represented by a number. However, it will as a rule be expedient for mixtures having different chain lengths to be present, if appropriate, in each case, so that the radicals of the structural units in the polycondensation product have different numerical values for a and independently for b.

In particular, formaldehyde, acetaldehyde, trichloroacetaldehyde, propionaldehyde, butyraldehyde, isobutyraldehyde, isononylaldehyde and dodecanal, aromatic aldehydes, such as benzaldehyde and naphthylaldehyde, and compounds which can liberate such aldehydes under the reaction conditions, such as, for example, trioxane, hexamethylenetetramine and paraformaldehyde, the trimeric and tetrameric forms of acetaldehyde and dialkylacetals are suitable as aldehydes used in the polycondensation. Paraformaldehyde is particularly suitable.

In a preferred embodiment, the polycondensation product therefore contains a further structural unit (IV) which is represented by the following formula (IV)

where
Y, independently of one another, are identical or different and are represented by (I), (II) or further constituents of the polycondensation product,
where
$R^5$ are identical or different and are represented by H, $CH_3$ or a substituted or unsubstituted aromatic or heteroaromatic compound having 5 to 10 C atoms,
where
$R^6$ are identical or different and are represented by H, $CH_3$ or a substituted or unsubstituted aromatic or heteroaromatic compound having 5 to 10 C atoms.

Here, $R^5$ and $R^6$ in structural unit (IV), independently of one another, are preferably represented by H and/or methyl.

As a rule, the polycondensation product according to the invention is present in aqueous solution which contains 2 to 90% by weight of water and 98 to 10% by weight of dissolved dry matter, preferably 40 to 80% by weight of water and 60 to 20% by weight of dissolved dry matter, particularly preferably 45 to 75% by weight of water and 55 to 25% by weight of dissolved dry matter. The dry matter then substantially consists of the anhydrous polycondensation product but advantageously may also contain further components, such as antifoams and other auxiliaries.

The hydrophobicity of the polycondensation product according to the invention can be adjusted according to the intended use. In addition to the choice of the chain length of the polyisobutylene side chain, in particular the molar ratio for the incorporation of structural units (II) and optionally (III) by condensation is suitable for this purpose. Overall, the molar ratios of the structural units (I), (II), (IV) and optionally (III) of the polycondensation product according to the invention can be varied within wide ranges. It has proved to be expedient if the molar ratio of the structural units [(I)+(II)+(III)]:(IV) is 1:0.8 to 3, preferably 1:0.9 to 2 and particularly preferably 1:0.95 to 1.2, it being possible for (III) to assume the value zero.

The molar ratio of the structural units (I):[(II)+(III)] is in particular 1:100 to 100:1, preferably 1:7 to 5:1 and particularly preferably 1:5 to 3:1, it being possible for (III) also to assume the value zero.

In a further embodiment, the molar ratio of the structural units (II):(III) can be adjusted to 1:0.005 to 1:10, furthermore 1:0.01 to 1:1, in particular 1:0.01 to 1:0.2 and particularly preferably 1:0.01 to 1:0.1.

Frequently, the polycondensation product according to the invention has a weight average molecular weight of 4000 g/mol to 150 000 g/mol, preferably 10 000 to 100 000 g/mol and particularly preferably 20 000 to 75 000 g/mol.

The present invention also relates to a process for the preparation of a polycondensation product, the reaction mixture containing at least one aromatic and/or heteroaromatic monomer having at least one polyisobutylene side chain, at least one monomer comprising an aromatic and/or heteroaromatic group and at least one ionizable functional group and at least one monomer comprising an aldehyde group being subjected to polycondensation in the presence of a catalyst and the water content of the product obtained after the polycondensation preferably being less than 30% by weight, preferably less than 20% by weight and particularly preferably less than 6% by weight.

The water content of the reaction mixture has proved to be an important parameter, low water contents leading to better results in the polycondensation. High water contents may even completely suppress a polycondensation. Preferably used monomers are therefore those which contain no water, for example paraformaldehyde. A further possibility consists in removing the water used or water formed during the condensation by azeotropic distillation, in particular toluene and benzene being suitable as entraining agents.

As a rule, the polycondensation is carried out in the presence of an acidic catalyst, this preferably being sulphonic acid, in particular saturated and unsaturated alkane-sulphonic acids, such as methanesulphonic acid, octanesulphonic acid, dodecane-sulphonic acid, vinylsulphonic acid and/or allyl-sulphonic acid, and aromatic sulphonic acids, such as para-toluenesulphonic acid, benzenesulphonic acid and/or dodecyl-benzenesulphonic acid.

The polycondensation is advantageously carried out at a temperature between 20 and 140° C. and a pressure between 1 and 10 bar. In particular, a temperature range between 50 and 120° C. has proved to be expedient. The duration of reaction may be between 0.1 and 24 hours, depending on the temperature, the chemical nature of the monomers used and the degree of crosslinking strived for. When the desired degree of crosslinking is reached, which can also be determined, for example, via the measurement of the viscosity of the reaction mixture, the reaction mixture is cooled.

According to a particular embodiment, the reaction mixture is subjected to a thermal aftertreatment at a pH between 8 and 13 and a temperature between 60 and 130° C. after the end of the condensation reaction. As a result of the thermal aftertreatment, which advantageously lasts for between 5 minutes and 5 hours, it is possible substantially to reduce the aldehyde content, in particular the formaldehyde content, in the reaction solution.

In a further particular embodiment, the present invention envisages that the reaction mixture will be subjected to a vacuum aftertreatment at pressures between 10 and 900 mbar after the end of the condensation reaction, for reducing the aldehyde content. Furthermore, other methods known to a person skilled in the art can however also be used for reducing the formaldehyde content. One example is the addition of small amounts of sodium bisulphite, ethyleneurea and/or polyethyleneimine.

The polycondensation products obtained can be used directly as an additive for hydraulic binders. In order to obtain a better shelf-life and better product properties, it is advantageous to treat the reaction solutions with basic compounds. It is therefore to be regarded as being preferable to react the reaction mixture after the end of the reaction with a basic sodium, potassium, magnesium, aluminium, zinc, ammonium or calcium compound. Sodium hydroxide, potassium hydroxide, magnesium hydroxide, aluminium hydroxide, zinc hydroxide, ammonium hydroxide or calcium hydroxide have proved to be particularly expedient here, whereby it is to be regarded as being preferable to neutralize the reaction mixture. Suitable salts of the phosphated polycondensation products are, however, also other alkali metal and alkaline earth metal salts and salts of organic amines.

Preferred polycondensation products are those wherein the polycondensation product is treated, with particular preference neutralized, with a basic compound. With more particular preference the polycondensation product after the treatment with a basic compound is present wholly or partly in its salt form, with more particular preference in its alkali metal and/or alkaline earth metal salt form. Furthermore, however, the present invention also envisages the preparation of mixed salts of the phosphated polycondensation products. These can expediently be prepared by the reaction of the polycondensation products with at least two basic compounds.

Thus, by a targeted choice of suitable alkali metal and/or alkaline earth metal hydroxides, it is possible to prepare by neutralization salts of the polycondensation products according to the invention, by means of which the duration of processability of aqueous suspensions of inorganic binders and in particular of concrete can be influenced. While a reduction in the processability over time is observable in the case of the sodium salt, a complete reversal of this behaviour takes place in the case of the calcium salt of the identical polymer, a lower water reduction (low slump) occurring at the beginning and increasing with time. As a result of this, sodium salts of the phosphated polycondensation products lead over time to a decrease in the processability of the binder-containing material, such as, for example, concrete or mortar, while the corresponding calcium salts lead with time to improved processability. By a suitable choice of the amount used of sodium and calcium salts of the phosphated polycondensation products, the development of the processability of binder-containing materials over time can therefore be controlled. Expediently, the corresponding phosphated polycondensation products which consist of sodium and calcium salts are prepared by reaction with a mixture of basic calcium and sodium compounds, in particular calcium hydroxide and sodium hydroxide.

In the case of the polycondensation products according to the invention, it has proven particularly advantageous that they can be prepared via a very economical process, no further purification of intermediates being necessary. In particular, no waste substances which have to be disposed of form in the process according to the invention. Thus, from environmental points of view too, the claimed process represents further progress compared with the prior art. The reaction mixture obtained can be fed directly to the intended use. The underlying object of developing an admixture for cementitious binder systems which further increases the durability of concrete structures and in particular protects the reinforcement steel from corrosion is therefore achieved in its entirety.

The present invention is to be described in more detail below with reference to working examples.

EXAMPLES

General Method for the Preparation of the Polycondensates

A reactor equipped with a stirrer is heated to an internal temperature of 95° C. and filled with the starting materials 1 and 2 and optionally polyisobutylene-phenol (PiB-phenol) according to Table 1 and the stirrer is switched on (100 revolutions/minute). As soon as the reaction mixture has reached a temperature of 90° C., the catalyst is added. The jacket temperature of the reactor is now increased to 130° C. As soon as the reaction mixture has reached a temperature of 100° C., the starting material 3 is added. The reaction is now allowed to continue for 4 hours at an internal temperature of 120° C. with stirring, a substantial increase in viscosity being found. The reaction mixture is then cooled. As soon as an internal temperature of 100° C. is reached, 10% by weight of water, based on the total mass, are added and stirring is effected for a further 30 min. Up to 3 mole-equivalents of 50% strength sodium hydroxide solution, based on starting material 2, are then added. (In the examples shown below, in each case 2 mole-equivalents of 50% strength sodium hydroxide solution are used.) After the sodium hydroxide solution has been uniformly mixed in, dilution to a solids content of 50% by weight is effected with water. The polycondensates according to the invention are present as a white to yellowish white emulsion.

A plasticizer according to WO 2006/042709 which contains no PiB-phenols serves as a reference.

TABLE 1

| Example | PiB-phenol type/[g] | Starting material 1 type/[g] | Starting material 2 type/[g] | Starting material 3 type/[g] | Catalyst type/[g] |
|---|---|---|---|---|---|
| Reference | —/— | C/165 | D/28.8 | F/5.5 | G/13 |
| 1 | A/6.1 | B/321 | D/84.7 | E/11.4 | G/19 |
| 2 | A/13.1 | B/217 | D/84.7 | F/11.3 | H/15 |
| 3 | A/12.5 | B/216 | D/84.2 | E/11.3 | G/19 |
| 4 | A/18 | B/204 | D/84.2 | E/11.3 | G/19 |
| 5 | A/24.1 | B/192.5 | D/84.5 | E/11.4 | G/19 |
| 6 | A/42.1 | B/156.5 | D/84.5 | E/11.4 | G/19 |
| 7 | A/60 | B/121 | D/84.6 | E/11.3 | G/19 |
| 8 | A/4.55 | C/127.6 | D/26.4 | E/3.3 | G/8.8 |

A = PiB-phenol (CAS No.: 112375-88-9) having an average molecular weight of about 1000 g/mol.
B = polyethylene glycol monophenyl ether (CAS No.: 9004-78-8) having an average molecular weight of about 2000 g/mol.
C = polyethylene glycol monophenyl ether (CAS No.: 9004-78-8) having an average molecular weight of about 5000 g/mol.
D = polyethylene glycol monophenyl ether phosphoric acid ester (CAS No.: 39464-70-5) having an average molecular weight of about 350 g/mol.
E = trioxane,
F = paraformaldehyde,
G = methanesulphonic acid,
H = sulphuric acid Testing of the Plasticizing Effect of the Polycondensates in Fresh Concrete The tests were carried out according to DIN EN 206-1, DIN EN 12350-2 and DIN EN 12350-5. Cement: CEM I 42.5 R Bernburg (330 kg/m$^3$ concrete). The dose of the plasticizers was chosen so that the fresh concrete had an initial slump of 60±2 cm. The dosage data are based on the active substance content per amount of cement used. The results are summarized in Table 2.

TABLE 2

| CEM [kg] | H$_2$O [l/m$^3$] | w/c | Plasticizer | Dose, based on cement | Temp. concrete [° C.] | Slump in [cm] 0 min | 10 min | 30 min | 60 min |
|---|---|---|---|---|---|---|---|---|---|
| 330 | 158.4 | 0.48 | Reference | 0.18% | 20.7 | 59.5 | 54 | 41 | 35 |
| 330 | 158.4 | 0.48 | 8 | 0.22% | 21.1 | 61.5 | 53 | 37.5 | 34.5 |
| 330 | 158.4 | 0.48 | 4 | 0.24% | 21 | 60.5 | 49 | 35 | 33 |
| 330 | 158.4 | 0.48 | 7 | 0.24% | 20.8 | 58.5 | 53 | 38 | 35 |

Cement (CEM): Bernburg CEM I 42.5 R

It is evident that the polymers according to the invention are in principle capable of displaying a plasticizing effect comparable to that of the reference plasticizer without polyisobutylene side chains.

Testing of the Hydrophobizing Effect of the Polycondensates in Mortar Prisms

1. Brief Description of the Method

If concrete is immersed in water, the water is sucked into the concrete through the capillary pores present in the concrete. By means of the "capillary water absorption" experiment, it is possible to assess how a building material behaves with regard to water absorption and material transport.

Further information on the method, on the evaluation and on the assessment of the results is to be found in DIN EN ISO 15148, 2003-03, "Determination of the water absorption coefficient on partial immersion", and in Issue 422 of the Deutsche Ausschuss für Stahlbeton (DAfStb) [German Committee for Reinforced Concrete], "Testing of concrete—recommendations and information as a supplement to DIN 1048", 1991.

If the water absorption and hence also the material transport through the binder matrix are made more difficult, the result of this on use in practice is that reinforcement steel in structures is protected from corrosion.

2. Test Specimens

Mortar prisms having the dimensions 40 mm×40 mm×160 mm were produced with the aid of a stacking frame. For minimizing errors, in each case six mortar prisms were produced with each plasticizer. A mortar comprising Karlstadt CEM I 42.5R and standard sand with w/c=0.5 and s/c=2.8 was used for producing the prisms. The plasticizers were each used with a dose of 0.2% by weight of active substance, based on cement.

3. Preliminary Storage

The test specimens were stored in the mould in a humidity cabinet at (20.0±2.0)° C. for a duration of (24±2) h after production. After removal from the mould, the prisms were sanded in the dry state with 320-grade abrasive paper for 10 seconds per side. The dust was then blown off or brushed off. The test specimens were stored first for seven days at 20° C. under water and then for 13 days in a drying oven at 50° C. with a high rate of air exchange. The test specimens were then cooled for 24 hours at 20° C./65% r.h.

4. Reference Measurement (m$_{kd}$)

After the preliminary storage, the test specimens were weighed (m$_{kd}$). The reference measurement is effected directly after cooling.

5. Main Storage

The test specimens were placed in a water-filled tank on triangular strips. The depth of immersion of the prisms was 5±1 mm. The water level was kept constant over the entire observation period.

6. Test

The beginning of the measurement for determining the capillary water absorption is the time of immersion of the prisms in the water bath. The samples were tested after 30 min, 1 h, 2 h, 3 h, 4 h, 6 h, 22 h, 23 h and 24 h. For the test, the prisms were wiped until there was no shiny water film and were weighed and then placed back in the water bath. The measured values of the six prisms per plasticizer were averaged (cf. Table 3) and are plotted against the time (square root) in FIG. 1.

TABLE 3

| Time (square root) | Plasticizer used, dose = 0.2% by weight of active substance, based on cement | | | | | | | |
|---|---|---|---|---|---|---|---|---|
| | 1 | 2 | 3 | 4 | 5 | 6 | 7 | Reference |
| | Percentage water absorption | | | | | | | |
| 0 | 0 | 0 | 0 | 0 | 0 | 0 | 0 | 0 |
| 0.71 | 1.06 | 1.01 | 0.90 | 1.00 | 0.91 | 0.97 | 1.05 | 1.70 |
| 1.00 | 1.48 | 1.35 | 1.22 | 1.36 | 1.26 | 1.33 | 1.41 | 2.36 |
| 1.41 | 2.02 | 1.76 | 1.68 | 1.91 | 1.74 | 1.84 | 1.94 | 3.26 |
| 1.73 | 2.43 | 2.06 | 2.02 | 2.29 | 2.09 | 2.20 | 2.32 | 3.88 |
| 2.00 | 2.76 | 2.28 | 2.30 | 2.60 | 2.37 | 2.52 | 2.64 | 4.40 |
| 2.45 | 3.26 | 2.62 | 2.72 | 3.07 | 2.80 | 2.97 | 3.11 | 5.18 |
| 4.69 | 5.07 | 3.73 | 4.24 | 4.76 | 4.28 | 4.60 | 4.82 | |
| 4.80 | 5.12 | 3.75 | 4.29 | 4.82 | 4.32 | 4.65 | 4.87 | 7.63 |
| 4.90 | 5.18 | 3.79 | 4.33 | 4.87 | 4.36 | 4.70 | 4.92 | 7.68 |

Figure 1:
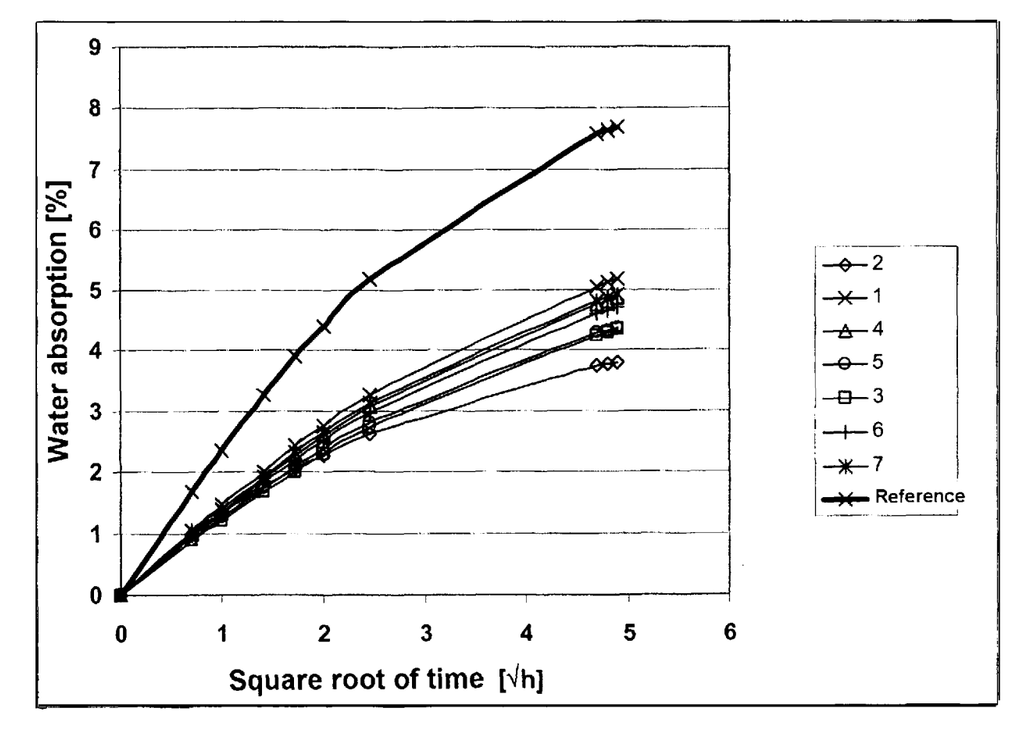

As is clearly evident from Table 3 and FIG. 1, the capillary water absorption is substantially reduced with the use of the polycondensates according to the invention compared with the prisms produced using the reference composition.

The invention claimed is:

1. A polycondensation product based on aromatics and/or heteroaromatics and aldehydes, wherein the product contains
   a) at least one structural unit (I) represented by the following general formula (I)

wherein G are identical or different and are represented by a substituted or unsubstituted aromatic or heteroaromatic compound having 4 to 12 C atoms,
   wherein q=0 to 4,
   wherein F, independently of one another, are identical or different and are represented by OH, OR$^1$, NH$_2$, NHR$^1$, NR$^1_2$, C$_1$ to C$_{10}$ alkyl, SO$_3$H, COOH, PO$_3$H$_2$, or OPO$_3$H$_2$, it being possible for the C$_1$ to C$_{10}$ alkyl radicals in turn to have phenyl or 4-hydroxyphenyl radicals and R$^1$ denoting a C$_1$ to C$_4$ radical,
   wherein J are identical or different and are represented by a polyisobutylene side chain, and b) at least one structural unit (II) having an ionizable functional group and an aromatic or heteroaromatic, structural unit (I) differing from structural unit (II) and the aldehyde used having no acid or ester functions.

2. The polycondensation product according to claim 1, wherein the product contains between 0.01 and 99.9% by weight of the structural unit (I) and between 0.01 and 99.9% by weight of the structural unit (II).

3. The polycondensation product according to claim 1, wherein the structural unit (I) is 4-polyisobutylenephenol.

4. The polycondensation product according to claim 1, wherein the ionizable functional group of the structural unit (II) is at least one ionizable functional group from the series consisting of $SO_3H$, $COOH$, $PO_3H_2$, dialkylamine, trialkylammonium and $OPO_3H_2$.

5. The polycondensation product according to claim 1, wherein the structural unit (II) is represented by the following general formulae

L-Q-O-M                                         (II)

Q are identical or different and are represented by a substituted or unsubstituted aromatic or heteroaromatic compound having 4 to 12 C atoms, L are identical or different and are represented by an ionizable functional group from the series consisting of $SO_3H$, $COOH$, $PO_3H_2$, $OPO_3H_2$, dialkylamine and trialkylammonium, O is oxygen, M are identical or different and are represented by H, a $C_1$ to $C_{10}$ alkyl radical, $C_1$ to $C_{10}$ hydroxyalkyl radical, $C_1$ to $C_{10}$ carboxylic acid, aryl radical or heteroaryl radical.

6. The polycondensation product according to claim 1, wherein the structural unit (II) is represented by the following general formulae where D are identical or different and are represented by a substituted or unsubstituted aromatic or heteroaromatic compound having 4 to 12 C atoms, where E are identical or different and are represented by N, NH or O, where m=2 if E=N and m=1 if E=NH or O, where $R^3$ and $R^4$, independently of one another, are identical or different and are represented by a branched or straight-chain $C_1$ to $C_{10}$ alkyl radical, $C_5$ to $C_8$ cycloalkyl radical, aryl radical, heteroaryl radical or H, where b are identical or different and are represented by an integer from 0 to 300.

7. The polycondensation product according to claim 1, wherein the structural unit (II) is phenoxyethanol phosphate, N-phenyldiethanolamine diphosphate, anisolesulphonic acid, phenoxyethanolsulphonic acid, phenolsulphonic acid, phenoxyacetic acid or phenoxypropionic acid.

8. The polycondensation product according to claim 1, wherein the product contains at least one further structural unit (III) which is represented by the following general formulae where A are identical or different and are represented by a substituted or unsubstituted aromatic or heteroaromatic compound having 4 to 12 C atoms, where B are identical or different and are represented by N, NH or O, where n=2 if B=N and n=1 if B=NH or O, where $R^1$ and $R^2$, independently of one another, are identical or different and are represented by a branched or straight-chain $C_1$ to $C_{10}$ alkyl radical, $C_5$ to $C_8$ cycloalkyl radical, aryl radical, heteroaryl radical or H, where a are identical or different and are represented by an integer from 1 to 300, where X are identical or different and are represented by a branched or straight-chain $C_1$ to $C_{10}$ alkyl radical, $C_5$ to $C_8$ cycloalkyl radical, a branched or straight-chain $C_1$ to $C_{10}$ carboxylic acid ester radical, aryl radical, heteroaryl radical or H.

9. The polycondensation product according to claim 1, wherein the aromatic or heteroaromatic of the structural unit (II) is phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl or 4-methoxynaphthyl.

10. The polycondensation product according to claim 1, wherein the product contains at least one structural unit (IV) which is represented by the following general formula where Y, independently of one another, are identical or different and are represented by (I), (II) or further constituents of the polycondensation product, where $R^5$ are identical or different and are represented by H, $CH_3$ or a substituted or unsubstituted aromatic or heteroaromatic compound having 5 to 10 C atoms, where $R^6$ are identical or different and are represented by H, $CH_3$ or a substituted or unsubstituted aromatic or heteroaromatic compound having 5 to 10 C atoms.

11. The polycondensation product according to claim 1, wherein the polycondensation product is present in an aqueous system which contains 2 to 90% by weight of water and 98 to 10% by weight of dry matter.

12. The polycondensation product according to claim 1, wherein the polycondensation product is treated with a basic compound.

13. Process for the preparation of a polycondensation product according to claim 1, wherein the reaction mixture containing
   a) at least one aromatic and/or heteroaromatic monomer having at least one polyisobutylene side chain represented by general formula (I),
   b) at least one monomer comprising an aromatic and/or heteroaromatic group and at least one ionizable functional group and c) at least one monomer comprising an aldehyde group having no acid or ester functions,
is subjected to polycondensation in the presence of a catalyst.

14. The process according to claim 13 wherein the catalyst is at least one sulphonic acid.

15. A process comprising adding a polycondensation product according to claim 1 as an admixture for an aqueous suspension of hydraulic and/or latently hydraulic binder.

16. The polycondensation product according to claim 8, wherein the aromatic or heteroaromatic of the structural units (II) and (III) is phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl or 4-methoxynaphthyl.

17. A polycondensation product based on aromatics and/or heteroaromatics and aldehydes, wherein the product contains
a) at least one structural unit (I) which is 4-polyisobutylenephenol, and
b) at least one structural unit (II) having an ionizable functional group and an aromatic or heteroaromatic, structural unit (I) differing from structural unit (II) and the aldehyde used having no acid or ester functions.

18. A polycondensation product based on aromatics and/or heteroaromatics and aldehydes, wherein the product contains
a) at least one structural unit (I) having a polyisobutylene side chain and an aromatic or heteroaromatic and
b) at least one structural unit (II) having an ionizable functional group and an aromatic or heteroaromatic, structural unit (I) differing from structural unit (II) and the aldehyde used having no acid or ester functions,
wherein the structural unit (II) is represented by the following general formula

L-Q-O-M    (II)

wherein Q are identical or different and are represented by a substituted or unsubstituted aromatic or heteroaromatic compound having 4 to 12 C atoms,
wherein L are identical or different and are represented by an ionizable functional group from the series consisting of $SO_3H$, $COOH$, $PO_3H_2$, $OPO_3H_2$, dialkylamine and trialkylammonium,
wherein 0 is oxygen, and
wherein M are identical or different and are represented by H, a $C_1$ to $C_{10}$ alkyl radical, $C_1$ to $C_{10}$ hydroxyalkyl radical, $C_1$ to $C_{10}$ carboxylic acid, aryl radical or heteroaryl radical.

19. A polycondensation product based on aromatics and/or heteroaromatics and aldehydes, wherein the product contains
a) at least one structural unit (I) having a polyisobutylene side chain and an aromatic or heteroaromatic and
b) at least one structural unit (II) having an ionizable functional group and an aromatic or heteroaromatic, structural unit (I) differing from structural unit (II) and the aldehyde used having no acid or ester functions,
wherein the structural unit (II) is represented by the following general formula (II)

wherein D are identical or different and are represented by a substituted or unsubstituted aromatic or heteroaromatic compound having 4 to 12 C atoms,
wherein E are identical or different and are represented by N, NH or O,
wherein m=2 if E=N and m=1 if E=NH or O,
wherein $R^3$ and $R^4$, independently of one another, are identical or different and are represented by a branched or straight-chain $C_1$ to $C_{10}$ alkyl radical, $C_5$ to $C_8$ cycloalkyl radical, aryl radical, heteroaryl radical or H, and
wherein b are identical or different and are represented by an integer from 0 to 300.

20. A polycondensation product based on aromatics and/or heteroaromatics and aldehydes, wherein the product contains
a) at least one structural unit (I) having a polyisobutylene side chain and an aromatic or heteroaromatic and
b) at least one structural unit (II) which is phenoxyethanol phosphate, N-phenyldiethanolamine diphosphate, anisolesulphonic acid, phenoxyethanolsulphonic acid, phenolsulphonic acid, phenoxyacetic acid or phenoxypropionic acid,
structural unit (I) differing from structural unit (II) and the aldehyde used having no acid or ester functions.

21. A polycondensation product based on aromatics and/or heteroaromatics and aldehydes, wherein the product contains
a) at least one structural unit (I) having a polyisobutylene side chain and an aromatic or heteroaromatic and
b) at least one structural unit (II) having an ionizable functional group and an aromatic or heteroaromatic, structural unit (I) differing from structural unit (II) and the aldehyde used having no acid or ester functions,
wherein the product contains at least one further structural unit (III) which is represented by the following general formula (III)

wherein A are identical or different and are represented by a substituted or unsubstituted aromatic or heteroaromatic compound having 4 to 12 C atoms,
where in B are identical or different and are represented by N, NH or O,
wherein n=2 if B=N and n=1 if B=NH or O,
wherein $R^1$ and $R^2$, independently of one another, are identical or different and are represented by a branched or straight-chain $C_1$ to $C_{10}$ alkyl radical, $C_5$ to $C_8$ cycloalkyl radical, aryl radical, heteroaryl radical or H,
wherein a are identical or different and are represented by an integer from 1 to 300,
wherein X are identical or different and are represented by a branched or straight-chain $C_1$ to $C_{10}$ alkyl radical, $C_5$ to $C_8$ cycloalkyl radical, a branched or straight-chain $C_1$ to $C_{10}$ carboxylic acid ester radical, aryl radical, heteroaryl radical or H.

22. The polycondensation product according to claim 21, wherein the aromatic or heteroaromatic of the structural unit (II) is phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl or 4-methoxynaphthyl.

23. The polycondensation product according to claim 21, wherein the aromatic or heteroaromatic of the structural units (II) and (III) is phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl or 4-methoxynaphthyl.

* * * * *